United States Patent [19]

Worster et al.

[11] 3,916,254

[45] Oct. 28, 1975

[54] ADJUSTABLE PINCUSHION CORRECTION CIRCUIT

[75] Inventors: Frederick E. Worster, Highland Park; Raymond T. Kostecki, Glenview, both of Ill.

[73] Assignee: Warwick Electronics Inc., Chicago, Ill.

[22] Filed: Feb. 13, 1974

[21] Appl. No.: 441,946

[52] U.S. Cl. .................................. 315/371; 315/370

[51] Int. Cl.[2] .......................................... H01J 29/56

[58] Field of Search ...................... 315/370, 371, 408

[56] References Cited

UNITED STATES PATENTS

| | | | |
|---|---|---|---|
| 2,649,555 | 8/1953 | Lockhart | 315/371 |
| 2,869,026 | 1/1959 | Sanford | 315/371 |
| 3,697,801 | 10/1972 | Eulenberg | 315/371 |
| 3,748,531 | 7/1973 | Boekhorst et al. | 315/371 |

*Primary Examiner*—Maynard R. Wilbur
*Assistant Examiner*—T. M. Blum
*Attorney, Agent, or Firm*—Wegner, Stellman, McCord, Wiles & Wood

[57] ABSTRACT

In a television receiver, a north-south pincushion correction circuit includes a switching transistor having a variable on-time controlled by a variable DC bias to phase shift a horizontal sawtooth coupled to a differential amplifier. A pair of diodes, coupled to the outputs of the differential amplifier, are maintained in the conduction region under control of a vertical sawtooth signal to generate a pincushion correction signal which is superimposed on the vertical sawtooth. The resultant is amplified by a vertical amplifier and drives vertical yoke coils to a sub-multiple of the horizontal sawtooth frequency.

14 Claims, 7 Drawing Figures

ADJUSTABLE PINCUSHION CORRECTION CIRCUIT

BACKGROUND OF THE INVENTION

This invention relates to a pincushion correction circuit using a differential amplifier and an adjustable phase shifting network.

In television receivers with wide deflection angles, the pincushion correction problem is severe, and is aggravated when very high voltages are required to deflect the electron beam. Correction of north-south pincushion distortion, also known as top-bottom distortion, by use of a conventional saturable reactor driven by parabolic currents at the horizontal frequency is not acceptable in solving this problem. It has been know, therefore, to use a single vertical amplifier for amplifying a vertical sawtooth with superimposed parabolic horizontal pulses. The single vertical amplifier drives a vertical yoke, tuned to the horizontal deflection frequency, to provide the desired parabolic correction waveform. The parabolic horizontal pulses have been generated by a circuit including a transistor which chops the vertical deflection signal into horizontal frequency pulses, and a transistor amplifier with a double differentiating feedback path including a phase adjustment variable resistor in series with the capacitor. An example of such a circuit is Haferl U.S. Pat. No. 3,700,958.

Another type of top-bottom pincushion correction circuit without saturable reactors uses a tapped horizontal autotransformer to develop a pair of opposed horizontal pulses which are passed to oppositely poled diodes coupled to a source of vertical sawtooth waveform. A series of horizontal pulses, modulated at the vertical deflection rate, are generated and opposed polarities are passed through another pair of diodes to a combining junction coupled with a variable inductor phase shifting network. The resulting phase shifted pulses are coupled through an amplifier to the vertical deflection yoke, which is separately driven by an amplified vertical sawtooth waveform from a vertical amplifier. An example of such a circuit is Kramer U.S. Pat. No. 3,479,554.

SUMMARY OF THE INVENTION

In accordance with the present invention, an improved pincushion correction circuit without saturable reactors provides adjustable correction for wide deflection angle CRTs using a very high ultor voltage. A pair of opposed waves of mirror symmetry are generated by a differential amplifier which may be formed by an integrated circuit. A diode-resistor network coupled to the pair of outputs of the differential amplifier has a single connection to the vertical sweep stage to cause the vertical sawtooth to select its own north-south pincushion correction signal. The phase of the correction signal can be accurately and easily adjusted by a variable bias source which controls the switching point of a transistor driven by a horizontal sawtooth wave. The circuit is readily adaptable to integrated circuit technology and provides highly accurate phase control.

One object of the present invention is the provision of a pincushion correction circuit using a differential amplifier to generate mirror image waves which are combined to provide a pincushion correction signal which can be superimposed on a vertical deflection signal.

Another object of the present invention is the provision of a pincushion correction circuit having improved phase angle adjustment including a switching device having a switching point controlled by a sawtooth signal and a variable DC bias.

Other features and advantages of the invention will be apparent from the following description and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

DESCRIPTION OF THE PREFERRED EMBODIMENT

Figure 1:
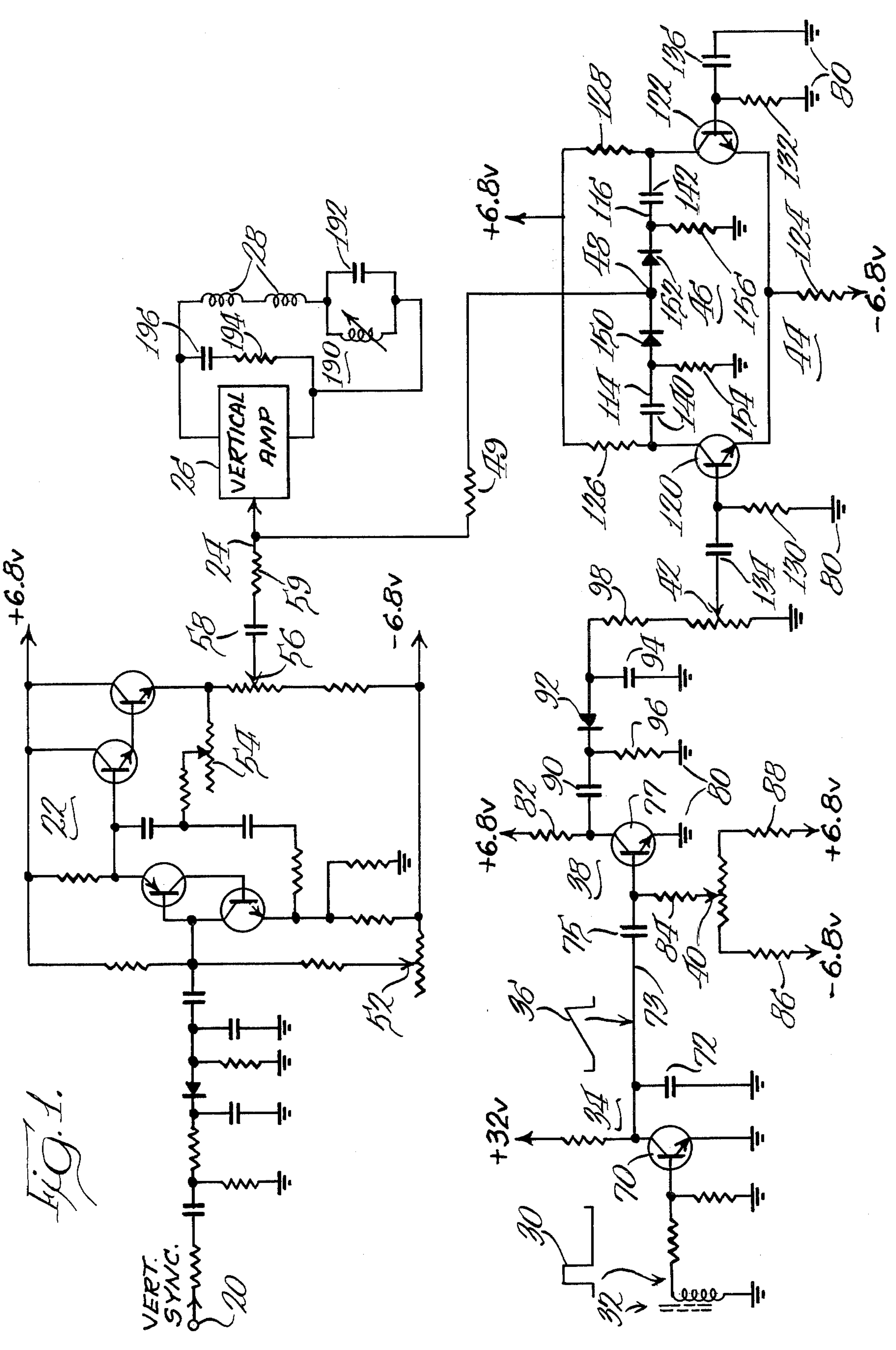
FIG. 1 is a schematic diagram of the adjustable pincushion distortion correction circuit.

Turning to FIG. 1, a north-south or top-bottom pincushion distortion correction circuit is illustrated for use in a conventional television receiver. A vertical sync source 20 provides a vertical or field synchronizing pulse which is coupled to a vertical oscillator 22 in order to generate on an oscillator output line 24 (which corresponds to the input to the vertical amplifier) a generally sawtooth sweep or deflection signal. The deflection signal is amplified by a vertical amplifier 26 and produces a sawtooth current in vertical yoke or deflection coils 28 associated with a television cathode ray tube or CRT. A conventional horizontal stage generates horizontal sweep or deflection current which drives horizontal yoke or deflection coils (not illustrated) to produce, in combination with vertical deflection, a raster on the television picture tube.

A north-south pincushion correction circuit receives a line or horizontal pulse 30 from a winding or a horizontal flyback transformer 32 in the horizontal output stage. The horizontal pulse 30 is coupled to an integrator 34 to produce a horizontal sawtooth waveform 36 which drives a transistorized phase shifting circuit 38 having an adjustable potentiometer 40 to accurately shift the switching point in time relative to the sawtooth waveform 36. The output of the switching circuit is a square wave which is coupled through a diode 92 to an integrating capacitor 94. The sawtooth generated by capacitor 94 is coupled through potentiometer 42 to a differential amplifier 44 which generates a pair of opposed, mirror symmetry waves which are coupled to a diode combining network 46 having a junction 48 directly coupled through a resistor 49 with the output line 24 of the vertical oscillator.

The diode combining network 46 forms a variable impedance circuit in which the impedances of the two legs are continuously variable in relation to the amplitude and polarity of the vertical sawtooth waveform. This produces a variable amount of loading and unloading to yield a resultant vertical sawtooth having a superimposed horizontal pincushion correction signal. The combined vertical sweep signal with horizontal correction is amplified by the single vertical amplifier 26 in order to drive the vertical deflection coils 28. The vertical yoke is tuned to one-half the horizontal frequency and rings in response to the correction signal so as to convert the correction waveform into a more desirable sinusoidal current variation which is sufficiently close to a parabola to provide the desired north-south pincushion correction.

Figure 2:
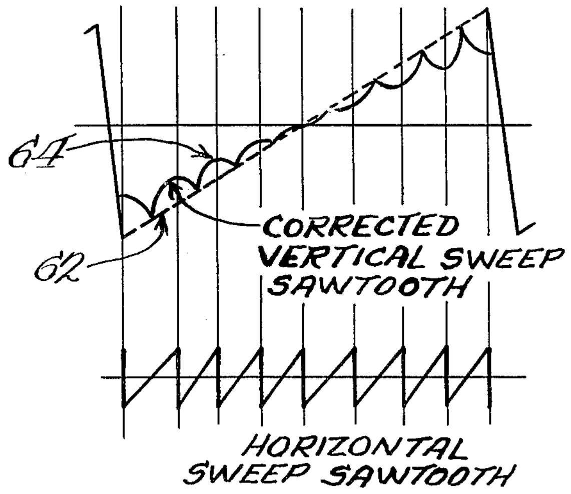
FIG. 2 is a waveform diagram illustrating the vertical deflection current flowing in the vertical yoke when modulated with a horizontal correction signal; and FIGS. *3a–3e* are waveform diagrams illustrating development of the horizontal correction signal at several points in the circuit of FIG. 1.

Considering in more detail the FIG. 1 circuit, the vertical oscillator 22 is of conventional design and includes a vertical hold potentiometer 52, a vertical linearity potentiometer 54, and a vertical size potentiometer 56. The wiper of the vertical size potentiometer 56 is coupled through a capacitor 58 and a resistor 59 to vertical output line 24 which forms the input to the single vertical amplifier 26. The vertical oscillator produces a sawtooth deflection or sweep current 62, as illustrated by the dashed lines in FIG. 2. For north-south pincushion correction, the vertical deflection current 62 carries a superimposed horizontal correction signal 64 whose absolute amplitude decreases continuously from the edges of the vertical sawtooth toward the zero or cross-over point, and is of opposite polarity on opposite sides of the zero line. The waveform shown in FIG. 2 is amplified by the vertical amplifier 26 to produce a similar waveform, of greater magnitude which flows to the vertical yoke coils 28.

The horizontal flyback pulse 30, having an amplitude such as +125 volts, is coupled from the flyback transformer 32 to the base of a transistor 70 which forms a part of the horizontal integrator 34. The collector of transistor 70 is coupled to an integrating capacitor 72 in order to produce on a line 73 a horizontal sweep sawtooth 36 having an amplitude such as 3.7 volts peak-to-peak. The line 73 is coupled through a DC blocking capacitor 75 to the base of a three terminal semiconductor switching device, in the form of a transistor 77. The emitter of transistor 77 is coupled directly to a source of reference potential or ground 80. The collector of the switching transistor is coupled through a load resistor 82 to a source of DC potential, such as +6.8 volts. The base of transistor 77 is coupled to a capacitor 75, and also to a variable DC bias source consisting of a resistor 84 coupled to the wiper of potentiometer 40. One side of the first resistance of potentiometer 40 is coupled through a resistor 86 to a source of −6.8 volts DC, and the opposite side is coupled through a resistor 88 to a source of +6.8 volts DC.

When the wiper of potentiometer 40 is located at a center position, the voltage divider produces a zero volt DC potential or level which coincides with the potential of ground 80. As the wiper is moved to either side of center, a positive or negative DC bias is produced and changes the switching point of transistor 77. It will be appreciated that the variable bias potential could be coupled to the emitter of the transistor for example. When differentiated pulse 36 arrives at the base of transistor 77, the transmitter saturates rapidly and produces a square wave which is coupled by a capacitor 90 and diode 92 to an integrating capacitor 94. The junction between capacitor 90 and diode 92 is shunted to ground 80 by a resistor 96. Capacitor 94 charges rapidly and discharges slowly to form a sawtooth wave. The integrated sawtooth available across capacitor 94 is coupled through a resistor 98 to the amplitude adjustment potentiometer 42, in order to provide an input to the differential amplifier 44.

Figures 3A, 3B, 3C, 3D, 3E:
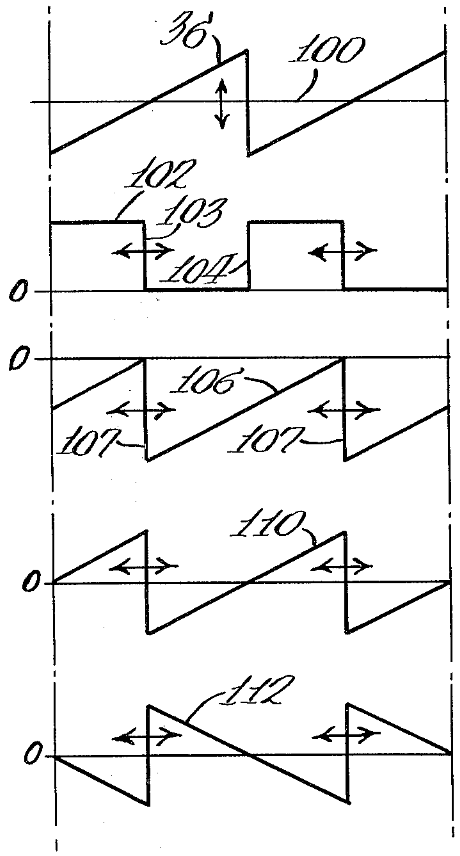

The operation of the phase control adjustment circuit 38 may be understood with reference to the waveforms shown in FIG. 3. The base of switching transistor 77 is driven by the sawtooth waveform 36 which is coupled through capacitor 75. The base is also biased by the variable DC source which produces an adjustable DC level 100 which is movable with respect to the sawtooth 36 by adjustment of the wiper of potentiometer 40. When the potentiometer is at the center position, producing a zero volt level, the adjustable level 100 has the position illustrated in FIG. 3*a*. As the sawtooth voltage 36 crosses over and exceeds the adjustable level 100 by an amount exceeding the semiconductor voltage drop for the base-emitter junction of switching transistor 77, the transistor is driven hard into conduction. This causes its collector voltage 102, see FIG. 3*b*, to drop to a near zero volts potential. The phase position of the leading edge 103 of the negative going square wave is controllable by the adjustable cross-over point between the sawtooth waveform 36 and the adjustable bias level 100. The leading edge 103 is passed to and rapidly charges the integrating capacitor 94. The lagging edge 104 is blocked by diode 92. The capacitor 94 then discharges slowly through resistor 98 and potentiometer 42 to produce a sawtooth waveform 106, FIG. 3*c*. The transistion edge 107 of the sawtooth corresponds to the leading edge 103 of the square wave and hence is adjustable in phase in accordance with the variable bias potential.

The sawtooth wave 106 is coupled to the differential amplifier 44 in order to produce a pair of output waveforms 110 and 112, FIGS. 3*d* and 3*e* respectively, of equal absolute value, which are produced at a pair of output lines 114 and 116, respectively. The waveforms 110 and 112 are of equal but opposite amplitude, i.e. are of mirror symmetry. The transition edges of the pair of sawtooths 110 and 112 are adjustable in position and follow the transition edge 107 of the integrated sawtooth 106.

Differential amplifier 46 includes a pair of transistors 120 and 122 having their emitters tied through a common emitter resistor 124 to a source of negative bias, such as −6.8 volts. The emitter resistor 124 serves as a current source for transistors 120 and 122. The collectors of differential transistors 120 and 122 are coupled through resistors 126 and 128, respectively, to a common positive bias source, such as +6.8 volts. The bases of the transistors are shunted to ground through resistors 130 and 132, and are coupled to capacitors 134 and 136. The opposite side of capacitor 134 is coupled to the wiper of the amplitude adjustment potentiometer 42, whereas the opposite side of capacitor 136 is coupled to ground 80. The collectors of differential pair transistors 120 and 122 are also coupled through capacitors 140 and 142, respectively, to output lines 114 and 116. The differential amplifier may be formed by an integrated circuit. At the collectors of transistors 120 and 122, two opposed sawtooths 110 and 112, FIGS. 3*d* and 3*e*, are produced which are of mirror symmetry and of continuously opposite polarity.

Diode combining network 46 includes a diode 150 located between capacitor 140 and a summing junction 48, and a diode 152 located between the summing junction 48 and capacitor 142. The anode of diode 150 is coupled through a resistor 154 to ground. Conversely, the cathode of diode 152 is coupled through resistor 156 to ground. The summing junction 48 is coupled through resistor 49 to the vertical oscillator output line 24. Due to the summing arrangement of diodes 150 and 152, the sawtooth signals driving the diodes will cancel at summing junction 48 when the summing junction is biased to zero volts by the vertical sawtooth. At all other times, the vertical oscillator continuously loads and unloads the diodes in a manner which unequally biases the diodes, thereby changing their relative impedances, to produce an amplitude and polarity modulated horizontal waveform which results in the output waveform 64 shown in FIG. 2.

The values of the circuit components are adjusted so that the vertical waveform always maintains the diodes 150 and 152 in the non-linear conducting region so that they are never biased fully on (which on condition requires about 3 volts). In particular, and for illustrative purposes only, the vertical waveform coupled through resistor 49 is selected to have an approximately 1.5 volts peak value, and the horizontal waveforms 110 and 112, FIGS. 3*d* and 3*e*, are selected to be about 0.5 volts peak-to-peak. Thus, the diodes are maintained in their non-linear conductive or on state in which their impedances are proportional to the biasing voltage, and hence vary with the vertical waveform.

When the vertical waveform 62 is negative, diode 150 is biased into its region of greater conduction relative to diode 152 and has an impedance which varies from a low to a higher level as the negative vertical sawtooth varies from its maximum negative voltage towards zero volts. Conversely, as the vertical sawtooth goes positive, diode 152 is biased into relatively greater conduction with respect to diode 150, which conduction increases in proportion to the positive amplitude of the vertical sawtooth. The resultant is a vertical sawtooth deflection current having a superimposed horizontal component which is polarity and amplitude modulated in accordance with the vertical sawtooth. It should be noted that only one connection is necessary between the vertical stage of the television receiver and the horizontal pincushion correction circuit, because the vertical sawtooth waveform which itself controls the pincushion correction circuit.

The vertical amplifier 26 which amplifies the modified vertical deflection signal may be of conventional design and is not illustrated in detail.

The vertical yoke coils 28 are tuned, by capacitor 196 in series with damping resistor 194 to one-half the horizontal line frequency in order to produce sinusoidal ringing in response to the horizontal component superimposed on the vertical sawtooth. If successive interruptions in vertical yoke current are made when each sinusoid is only half completed, a current waveform is derived within the vertical yoke which is satisfactory for north-south distortion correction and which approximates a parabola. Horizontal frequency components, which would destroy the one half sinusoidal current through the yoke, are attenuated by the filter consisting of the variable inductor 190 and the capacitor 192. These components are made to resonate at the horizontal sweep frequency and offer a high impedance path for currents at the horizontal frequency.

The foregoing disclosure of specific embodiments is illustrative of the broad inventive concepts comprehended by the invention.

Having described the invention, the embodiments of the invention in which an exclusive property of privelege is claimed are defined as follows:

1. In a television receiver having a sweep source for supplying a sweep signal to a first deflection coil, a pincushion correction circuit, comprising:

circuit means having an input terminal and a pair of output terminals, said input terminal being coupled to a pulse producing means, said circuit means operating to generate at its output terminals a pair of opposed signals of mirror symmetry and a variable impedance means having two terminals connected to the output terminals, respectively, of the circuit means and a third terminal connected to the sweep source, said impedance means having an impedance value related to the magnitude of the sweep signal whereby the impedance means variably loads the sweep source and a pincushion correction signal of continuously varying proportions is superimposed on the sweep signal.

2. The pincushion correction circuit of claim 1 wherein the variable impedance means comprises a pair of diodes coupled respectively between the pair of output terminals and a summing junction, means coupling the junction to the sweep source for driving the diodes with the sweep signal to cause the diodes to have impedance values related to the sweep signal.

3. The pincushion correction circuit of claim 2 including a source of reference ground, and wherein the sweep source supplies a sawtooth sweep signal having a sawtooth variation with respect to ground, and including a pair of resistors shunting to ground the pair of diodes at sides opposite the sides connected to the summing junction.

4. The pincushion correction circuit of claim 1 wherein the sweep signal has a sawtooth waveform and the variable impedance means produces a pincushion correction signal at approximately the frequency of the pulse producing means and including an amplifier responsive to the composite output signals of the sweep source, said amplifier being coupled to the output circuit for the deflection coil and including a network tuned to a frequency harmonically related to the frequency of the pulse producing means to produce ringing in response to the pincushion correction signal.

5. The pincushion correction circuit of claim 1 including a phase shifting circuit coupled between the pulse producing means and the input to the circuit means and including an element adjustable for shifting the phase of the opposed signals to thereby vary the phase of the pincushion correction signal.

6. The pincushion correction circuit of claim 5 wherein the pulse producing means supplies a pulse signal, means for integrating the pulse signal to derive a sawtooth signal, the phase shifting circuit includes a variable bias source having a variable DC bias in response to the adjustable element, a semiconductor switching device driven into conduction when the sawtooth signal and the variable DC bias are in predetermined relationship, and means coupling the semiconductor switching device to the input of the circuit means.

7. The pincushion correction circuit of claim 6 wherein the circuit means comprises a differential amplifier including a pair of three terminal semiconductor devices, means connecting a first terminal of each semiconductor device to a common resistor, means coupling the second terminals of the pair of semiconductor devices to respective load resistors, means coupling the third terminal of the first semiconductor device to the phase shifting circuit in order to form the input to the differential amplifier, means coupling the third terminal of the other semiconductor device to a reference source, and the variable impedance means is coupled to the second terminals of the pair of semiconductor devices to receive the pair of opposed signals generated by the pair of semiconductor devices.

8. In a television receiver having a first sawtooth sweep source for supplying a first sawtooth sweep signal to a first deflection coil and a source of sawtooth waves in time synchronism with a second sweep signal, a pincushion correction circuit, comprising:

- a switching device;
- a variable bias source for producing a DC bias of variable magnitude;
- phase shifting means driving the switching device into conduction when the sawtooth wave and the variable magnitude DC bias have a predetermined relationship therebetween, a change in the magnitude of the DC bias changing the conduction time of the switching device with respect to the sawtooth wave; and
- correction means coupled to the switching device for generating a pincushion correction signal having a phase controllable by the conduction time of the switching device.

9. The pincushion correction circuit of claim 8 wherein the switching device comprises a semiconductor switching device, the phase shifting means driving the semiconductor switching device into conduction when the first sawtooth wave crosses the magnitude of the DC bias thereby producing a pulse having a phase controllable by the variable bias source.

10. The pincushion correction circuit of claim 9 wherein the semiconductor switching device comprises a transistor having first, second and third terminals, the phase shifting means connects the sawtooth wave to the first terminal of the transistor, means coupling the variable bias source to the first terminal of the transistor, the correction means includes an integrator coupled to the third terminal and which is responsive to the pulse produced by the transistor for generating a sawtooth signal synchronized therewith, and means for modifying the sawtooth signal to produce the pincushion correction signal.

11. The pincushion correction circuit of claim 10 wherein the modifying means comprises a differential amplifier having an input coupled to the integrator and a pair of outputs carrying a pair of opposed waves of mirror symmetry, and means for continuously loading and unloading the first sawtooth sweep source in varying proportions in response to the sweep signal and the opposed waves to produce the pincushion correction signal.

12. The pincushion correction circuit of claim 8 wherein the source of sawtooth waves comprises an output winding of a flyback transformer for generating a horizontal flyback pulse, an integrator coupled to the flyback transformer winding for integrating the flyback pulse to generate a sawtooth waveform corresponding to the horizontal deflection sawtooth wave, and means coupling the integrator to the switching device.

13. The pincushion correction circuit of claim 8 including a source of reference potential, a positive DC source for supplying a fixed DC signal which is positive with respect to the reference potential, a negative DC source for supplying a fixed DC signal which is negative with respect to the reference potential, and the variable bias source includes a voltage divider coupled between the positive and negative DC sources and including a variable resistance for producing a DC bias of variable polarity and amplitude with respect to the reference potential, and the sawtooth wave source supplies the sawtooth wave with positive and negative polarities with respect to the reference potential.

14. The pincushion correction circuit of claim 8 wherein the correction means includes a differential amplifier having a pair of outputs carrying a pair of opposed waves of mirror symmetry and of a phase controllable by the variable bias source, and a pair of diodes coupled to the pair of outputs and operated in the non-linear conductive region for producing a variable impedance in response to the magnitude of the first sweep signal in order to produce the pincushion correction signal.

* * * * *

UNITED STATES PATENT OFFICE
CERTIFICATE OF CORRECTION

PATENT NO. : 3,916,254

DATED : October 28, 1975

INVENTOR(S) : FREDERICK E. WORSTER ET AL

It is certified that error appears in the above-identified patent and that said Letters Patent are hereby corrected as shown below:

Claim 9, line 2, after "wherein the" insert --first--;

line 5, after "when the" delete "first".

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*